May 8, 1962            G. W. DEAN            3,033,280

RELAY-CONTROLLED, SPRING-OPERATED VALVE

Filed Nov. 5, 1956            2 Sheets-Sheet 1

INVENTOR.
GORDON W. DEAN

BY

Alan M. Staubly

ATTORNEY

May 8, 1962 G. W. DEAN 3,033,280
RELAY-CONTROLLED, SPRING-OPERATED VALVE
Filed Nov. 5, 1956 2 Sheets-Sheet 2
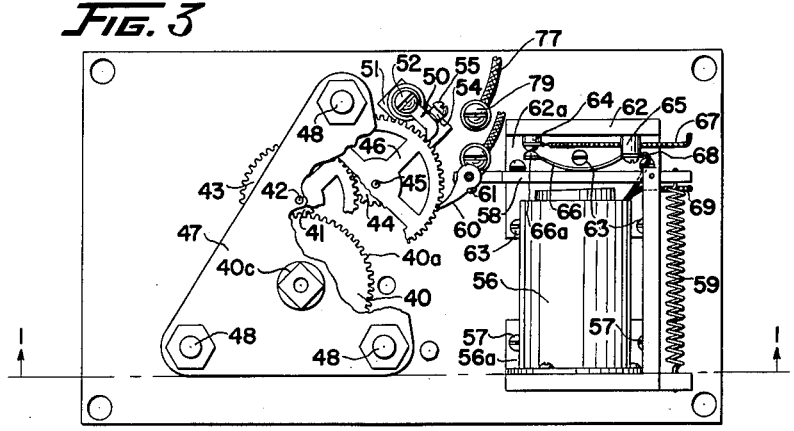
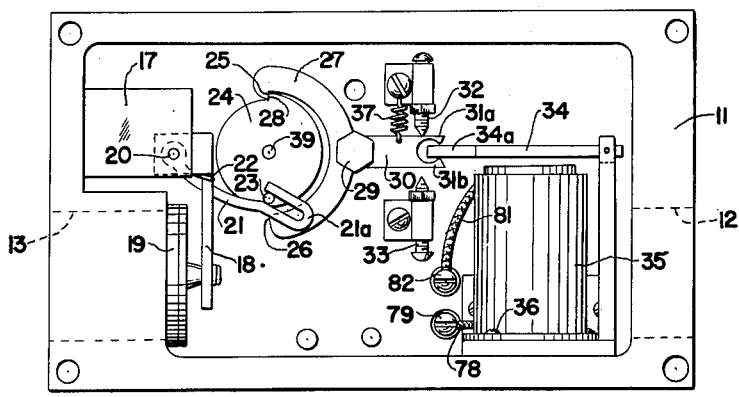
INVENTOR.
GORDON W. DEAN
BY
ATTORNEY United States Patent Office 3,033,280
Patented May 8, 1962

3,033,280
RELAY-CONTROLLED, SPRING-
OPERATED VALVE
Gordon W. Dean, Alhambra, Calif., assignor to Minneapolis-Honeywell Regulator Company, Minneapolis, Minn., a corporation of Delaware
Filed Nov. 5, 1956, Ser. No. 620,275
6 Claims. (Cl. 158—123)

This invention relates to temperature control systems or heat generators wherein fuel is burned to supply the necessary energy to change or to maintain the temperature or other condition of a space to or at a desired condition and, more specifically, the invention relates to fuel control apparatus that is adapted to be actuated by the energy developed by a thermoelectric unit heated by a pilot burner for igniting a main burner.

It is old in the prior art for a heating system to be controlled by the energy developed from the heating of a thermocouple unit by a pilot burner, wherein a room thermostat controls a relay operated pilot valve that, in turn, controls the operation of a diaphragm valve for supplying fuel to the main burner. This type of control is somewhat susceptible to failure due to the fact that a rupture may take place in the diaphragm that actuates the main valve.

It is the object of this invention to provide a control device wherein no flexible diaphragm is used to actuate the main control valve.

Another object of the invention is to provide a control device wherein means is provided to store energy developed by a thermocouple unit for directly actuating a spring closed valve between its open and closed positions, without utilizing gas pressure to help in its movement.

Another object of the invention is to make an energy storing means that is energized by a heat motor in response to the heat of a pilot burner for a main burner in a heating system or another type of heat generator, which means may directly operate a valve under the control of a condition responsive means.

A still further object of the invention is to make use of a motor means in the form of a spring wound by the intermittent operation of a relay energized by a thermocouple unit for directly operating a valve through an automatically or manually controlled tripping mechanism.

A still further object is to provide a latching mechanism operated by a relay for controlling the operation of a spring wound motor to cause it to operate in 180° rotational steps to cause movement of a valve between "off" and "on" positions.

Still other objects of the invention will become apparent upon reading the detailed description of the invention in conjunction with the accompanying drawing wherein:

FIGURE 3 is a plan view of the control device with the cover thereof removed and portions broken away; and FIGURE 4 is a bottom view of the control device with the base plate removed.

Figure 1:
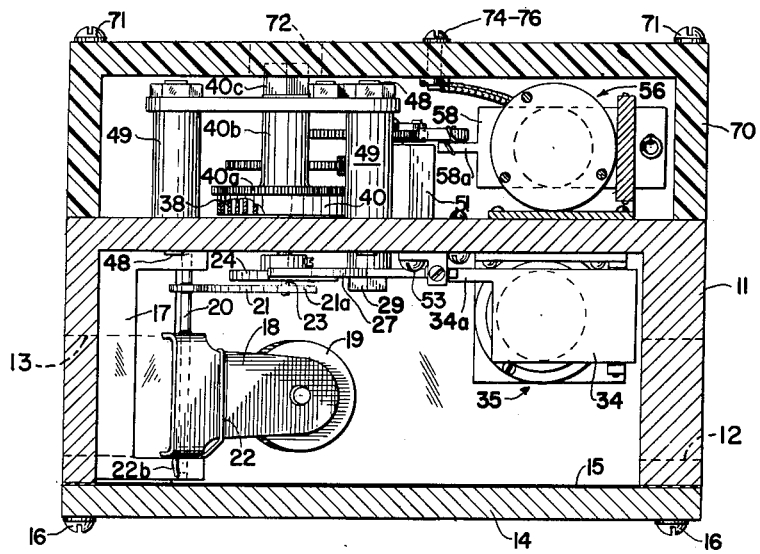
FIGURE 1 is a cross-sectional view in side elevation along the line 1—1 of FIGURE 3 of the drawing.

The control device of this invention comprises a body portion 11 having a threaded inlet 12 and a threaded outlet 13 adapted to be connected to a source of fuel and a burner, respectively. The body portion is open at its bottom but is closed by a base plate 14 that is secured thereto with a sealing gasket 15 therebetween by means of bolts 16.

Mounted on an end and top wall of the body 11 is a bracket member 17 secured thereto by means of bolts (not shown) extending through the bracket and into the wall. A lever 18, carrying a disk valve 19 at its free end, is welded or otherwise secured to a pivot 20 that is pivotally supported in the bracket 17. Also welded to the pivot 20 is a crank arm 21 having a yoke end 21a adapted to be engaged by a power-driven actuator to be presently described. A torque spring 22 is hooked over the lever 18, is wrapped around the pivot 20 and is hooked over a leg of the bracket 17 at 22b so as to normally bias the valve disk 19 into seating engagement over the outlet 13 at the inner surface of the valve body.

A motor for actuating the valve through the levers 21 and 18 includes crank pin 23 on a disk 24, which is constantly biased to rotate in a counterclockwise direction, as viewed in FIGURE 4 of the drawing, is adapted to engage the yoke 21a of the valve lever to move it to its open position. The disk 24 is prevented from rotating more than 180° by means of a hook 25 or an abutment shoulder 26 on a Y-shaped lever or yoke 27 engaging a radially extending shoulder 28 on the disk 24. The yoke 27 is pivotally secured to the top wall of the body portion 11 by means of a pivot bolt 29. The yoke has an actuating arm 30 which carries at its outer end a pair of tines 31a and 31b. Adjustable stops 32 and 33 limit the rocking movement of the arm 30 and therefore the yoke 27 to position either the hook 25 or the abutment shoulder 26 for engagement by the shoulder 28 on the rotatable disk 24. The arm is actuated by an extension 34a on an armature 34 of a relay 35. The relay and its supporting frame are secured to the body portion 11 by means of bolts 36. The motor has an energy storing means in the form of a helical or clock spring 37, which normally biases the arm 30 counterclockwise and the armature 34 clockwise, as viewed in FIGURE 4, to normally position the hook 25 against the disk 24. Energization of the relay 35 causes the armature 34 to move counterclockwise and the arm 30 and yoke 27 clockwise to disengage the hook 25 from the disk 24 and to position the abutment shoulder 26 of the yoke against the disk 24 to be engaged by the shoulder 28 as the disk 24 rotates 180°.

The disk 24 is constantly biased in one direction of rotation by means of a clock spring 38 anchored at its inner end to a drive shaft 39 which extends through the top wall of the body portion 11 and fixedly secured to the disk 24. The outer end of the spring is secured to the inner sidewall of a cup-shaped housing 40 having a gear wheel 40a formed around its periphery and a crank shaft 40b extending upwardly therefrom and milled off to form a four sided end 40c that is adapted to receive a winding key (not shown).

While the spring 38 is adapted to be manually wound, if desired as when initially starting the device in operation, the spring will normally be wound by means of a gear train consisting of a small gear 41 meshing with the gear 40a and secured to the same shaft 42 as a larger gear 43 and a small gear 44 meshing with the gear 43 and secured to the same shaft 45 as a larger gear 46. The gear shafts are supported in bearing sockets formed in the body wall 11 and in a plate 47 secured to the body 11 by means of bolts 48 extending through spacer sleeves 49 between the plate and the body 11.

The spring 38 is wound by the first gear 46 in the gear train being rotated in a clockwise direction as viewed in FIGURE 3 of the drawing. The natural tendency of the spring to cause the gear to rotate counterclockwise is prevented by a pawl 50 which is pivotally secured to a block 51 by means of a pivot bolt 52. The block 51 is secured to the top wall of the body 11 by means of a bolt 53 extending through the top wall and into the block 51. The pawl is constantly biased against the gears of the gear wheel 46 by means of a leaf spring 54 secured to the block 51 by means of a bolt 55.

The gear 46 is automatically rotated by means of a relay 56 secured to the top of body 11 by means of bolts 57 extending through the supporting frame thereof. An armature 58, as viewed in FIGURE 3 of the drawing, is normally biased away from the relay magnet by means of a tension spring 59 extending between the pivoted end of the armature and the relay frame. The other end of the armature has an extension 58a that carries at its outer end a pawl 60 that is pivoted on the armature and is spring biased by means of a torque spring 61 against the teeth of gear 46. It is thus seen that as the relay 56 is energized, the armature 58 will be pulled against the magnet of the relay and cause the pawl 60 to move the gear 46 a distance sufficient to advance one tooth of the gear past the pawl 50 that serves to prevent reverse movement of the gear. De-energization of the relay 56 will enable the spring 59 to return the armature 58 back to its starting position with the pawl 60 located behind the next following tooth of the gear 46. Repeated energization and de-energization of the relay 56 will cause tooth by tooth rotation of the gear 46.

A block of insulating material 62 has a base portion 62a that is secured to the body 11 by means of bolts 63 and carries or supports a fixed contact terminal 64 and a terminal 65. The terminal 65 clamps a flexible contact arm at one of its ends while holding the movable contact end 66a in position to engage the fixed contact 64. The flexible arm 66 is bowed intermediate its ends into engagement with the armature 58 so as to keep the movable contact 66a in engagement with contact 64 when the armature 58 is in its unattracted position. When the armature is moved by energization of the relay 56, the normal bias of the arm 66 will cause the arm to follow the movement of the armature and move the contact 66a out of engagement with the contact 64. These contacts are in series with the coil of the relay 56 so that when the contacts break, the relay is de-energized. It is therefore obvious that if a lead wire 67 is connected to the fixed terminal 64 and to a source of electrical energy, a lead wire 68 is secured to the movable contact 66a through the flexible arm 66 and the terminal 65 to one end of the coil of the relay, and a lead wire 69 is connected to the other end of the relay coil and the source of electrical energy, as long as the source of energy continues, the relay will be alternately energized and de-energized thus causing the gear 46 to be moved in a spring winding direction constantly, a gear tooth at a time until the spring is fully wound.

A cover 70 of insulating material is secured to the body 11 by bolts 71 and has an opening 72 therein, to permit a key to fit on the squared end 40c of the spring shaft, and a plurality of terminal bolts 74, 75 and 76 extending therethrough.

Lead wire 69 is secured to the inner end of connector terminal 74; lead wire 67 is connected to the inner end of connector 75 to which lead wire 77 is also connected; wire 77 is connected to a lead wire 78 from one end of the coil of relay 35 through an electrically insulated connector bolt 79 extending through the top wall of body 11; and the inner end of connector bolt 76 is connected by a lead wire 80 to a lead wire 81 to the other end of the coil of the relay 35 through a second connector bolt 82.

Figure 2:
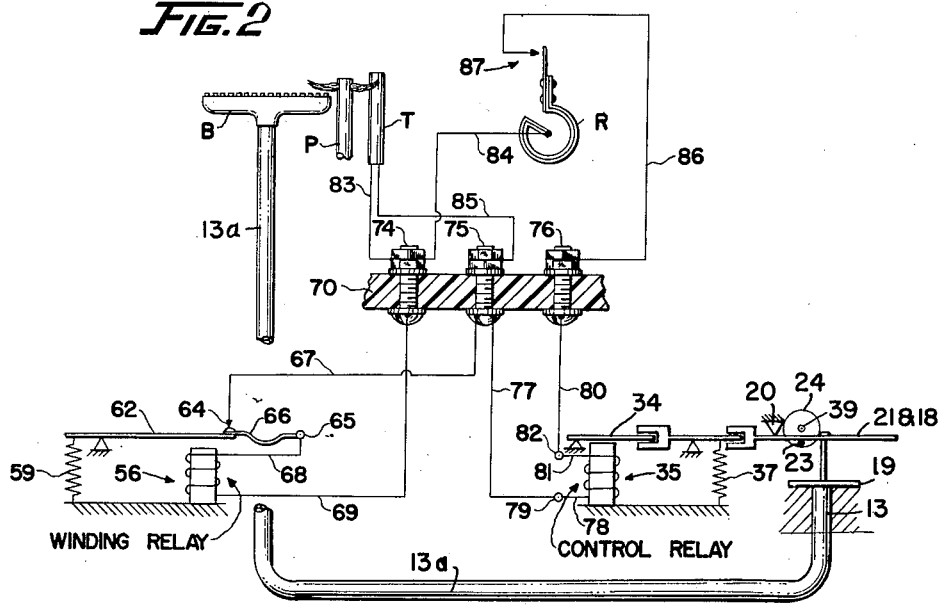
FIGURE 2 is a wiring diagram of a heating system embodying the invention.

The control device is electrically connected to the other units of a heating system, as can best be seen in FIGURE 2 of the drawing, by having the terminal 74 connected through a lead wire 83 to one end of a thermocouple or thermopile T, a second lead wire 84 also extending from terminal 74 to the movable contact element of a room thermostat, the terminal 75 connected through a lead wire 85 to the other end of the thermocouple or thermopile T, and the terminal 76 connected through a lead wire 86 to the fixed contact 87 of the room thermostat.

A main burner B is positioned to be ignited by a heat generator or pilot burner P which is also adapted to heat the hot junction of the thermocouple unit T.

*Operation*

In the operation of the control device and heating system described above, that is, with the inlet 12 of the control device connected to a source of fuel, the outlet 13 connected to the main burner B and the pilot burner P connected to the source of fuel, the system may be started by supplying fuel to the pilot burner and igniting it so that a flame will play on the hot junction end of the thermocouple unit and a second flame will extend over the main burner so that when gas is supplied to the main burner it will be ignited thereby. The heating of the thermocouple unit will cause continuous intermittent energization of the winding relay 56 until the spring is fully wound and will tend to keep the spring fully wound so long as there is a flame present at the pilot burner.

As long as the room thermostat R is in a satisfied condition, that is, with the movable arm out of engagement with the fixed contact 87, the relay 35 will remain de-energized and the valve will be held in its closed position, as illustrated in FIGURE 4 of the drawing. Should the room temperature drop sufficiently to cause the movable contact arm to engage the fixed contact, the relay 35 will be energized causing the armature 34 to move toward the pole of the relay and rotate the yoke 27 clockwise about the pivot 29, to release the hook 25 from the disk 24 and, simultaneously, to position the abutment end 26 thereof against the disk 24, so that the clock spring will rotate the disk 180°, thereby moving the pin 23 through an arch of 180°. This will position the yoke 21a on the other side of the shaft 39, as viewed in FIGURE 4 of the drawing, and move the valve 19 to its full open position, as shown in FIGURE 1 of the drawing. The abutment end 26 will be in engagement with the abutment shoulder 28 on the disk at this location and will retain the valve open until the relay 35 is de-energized, permitting the spring 37 to move the yoke 27 counterclockwise, to disengage the abutment end 26 from the abutment 28 and permit the clock spring to rotate the disk until abutment 28 engages the hook 25. As the disk 24 is rotated, following release of the disk by abutment 26, the pin 23 will move out of the yoke 21a to free the valve lever 18 and 21 to be moved to its closed position under the bias of torque spring 22. The pin 23 will continue on around 180° to a position just short of engagement with the yoke 21a but in alignment therewith so that upon another energization of the relay 35, in response for a demand of heat, it is ready once again to engage the yoke and move the valve to its open position.

While the preferred embodiment of the invention has been described above, it is deemed to be obvious to those skilled in the art that modifications may be made therein without departing from the spirit of the invention. Therefore, it is to be understood that the scope of the invention is to be determined from the following claims.

I claim:

1. A control device comprising a control member movable between "on" and "off" positions and normally biased to its "off" position, said member having a yoke thereon for actuating it between said positions, a spring driven motor means having a disc mounted on a shaft thereof, said disc having a pin extending into said yoke to actuate said member upon rotation of said disc, said disc having an abutment shoulder thereon, a Y-shaped lever pivoted intermediate its ends and having a hook on the end of one of its arms and an abutment end on the other arm for alternate engagement with said abutment shoulder with each half turn of said disc, a spring normally biasing said hook against said disc with the hook in engagement with said shoulder, a relay positioned to actuate said lever when energized to move said hook away from said disc and shoulder and said abutment end into engagement with the disc to free said disc to move said control to its "on" position with the abutment end checking the rotation of said disc in said "on" position, said relay when de-energized permitting reverse action of said lever to cause said control member to return to its "off" position with said hook positioned to be engaged by said shoulder, and motor means operable by power generated by a heated thermocouple for winding the spring of said motor.

2. A control device for fuel burning apparatus comprising a control member movable between "on" and "off" positions and normally biased to its "off" position, a spring driven motor having a drive shaft, said shaft having a crank pin extending therefrom into engagement with said control member to actuate said member upon rotation of said shaft, said shaft having an abutment shoulder thereon, a lever having a pair of arms with a hook on the end of one of its arms and an abutment end on the other arm for alternate engagement with said abutment shoulder with each half turn of said shaft, a spring normally biasing said hook against said shaft with the hook in engagement with said shoulder, a relay positioned to actuate said lever when energized to move said hook away from said shaft and shoulder and said abutment end into engagement with the shaft to free said shaft to move said control to its "on" position with the abutment end checking the rotation of said shaft in said "on" position, said relay when de-energized permitting reverse action of said lever to cause said control member to return to its "off" position with said hook positioned to be engaged by said shoulder, and motor means operable by power generated by heat from a pilot burner for winding the spring of said motor.

3. A control device comprising a control member movable between "on" and "off" positions and normally biased to its "off" position, said member having a yoke thereon for actuating it between said positions, a spring driven motor means having a disc mounted on a shaft thereof, said disc having a pin extending into said yoke to actuate said member upon rotation of said disc, said disc having an abutment shoulder thereon, a Y-shaped lever pivoted intermediate its ends and having a hook on the end of one of its arms and an abutment end on the other arm for alternate engagement with said abutment shoulder with each half turn of said disc, a spring normally biasing said hook against said disc with the hook in engagement with said shoulder, a relay positioned to actuate said lever when energized to move said hook away from said disc and shoulder and said abutment end into engagement with the disc to free said disc to move said control to its "on" position with the abutment end checking the rotation of said disc in said "on" position, said relay when de-energized permitting reverse action of said lever to cause said control member to return to its "off" position with said hook positioned to be engaged by said shoulder, and motor means operable by power generated by a heated thermocouple for winding the spring of said motor, said motor having a relay-operated pawl and gear mechanism for winding said spring and a relay-operated switch in series with the coil of said relay for intermittently energizing the relay.

4. A temperature control system comprising a main burner, a control member for supplying fuel to said burner, a motor for operating said member, said motor having energy storing means operably connected to said control member, temperature sensing means affected by the heat generated at said burner for releasing energy from the energy storing means to operate said control member, a pilot burner for said main burner, and power means continuously heated by said pilot burner and operating independently of said temperature sensing means to build up, little by little, energy in said energy storing means.

5. A condition control system comprising a main burner, a control member for supplying fuel to said burner, means biasing said member to non-fuel supplying position, a motor having energy storing means therein, means operably connecting said motor to said control member, actuating means for building up energy in said energy storing means, electrically operable condition responsive means responsive to the temperature of the space heated by said main burner for controlling the delivery of a limited amount of energy by said motor for the operation of said control member to a fuel supplying position, a normally continuously operable pilot burner for said main burner, and a thermocouple unit arranged to be continuously heated by said pilot burner, first circuit means for supplying energy from said thermocouple unit to said actuating means for energizing said energy storing means and second circuit means for supplying energy from said thermocouple unit to said condition responsive means for operation thereof, said first circuit means receiving energy from said thermocouple unit irrespective of the supply of energy to said condition responsive means.

6. In a control device, the combination comprising a control member, a motor for operating said control member, said motor having a power storing spiral spring, power means including a ratchet mechanism for continuously winding in steps said spring in one direction only by a low voltage electric current, a pilot burner, a thermocouple unit continuously heated by said pilot burner and connected to said power means, and condition responsive means for releasing said spring to partially unwind for limited control actuating movements of said motor to mechanically move said control member between "on" and "off" positions.

References Cited in the file of this patent

UNITED STATES PATENTS

| | | |
|---|---|---|
| 2,138,796 | Sparrow | Nov. 29, 1938 |
| 2,254,536 | Loeffler | Sept. 2, 1941 |
| 2,318,801 | Ray | May 11, 1943 |
| 2,368,850 | Lange | Feb. 6, 1945 |
| 2,582,419 | Dillman et al. | Jan. 15, 1952 |
| 2,640,313 | Cobb | June 2, 1953 |
| 2,646,660 | Schild | July 28, 1953 |
| 2,844,768 | Hilgert | July 22, 1958 |
| 2,876,786 | Hilgert | Mar. 10, 1959 |

FOREIGN PATENTS

| | | |
|---|---|---|
| 58,056 | Switzerland | Dec. 30, 1924 |